United States Patent
Kivits

(10) Patent No.: US 8,462,601 B1
(45) Date of Patent: *Jun. 11, 2013

(54) METHOD AND APPARATUS FOR OPTIMIZING OPTICAL RECORDING

(75) Inventor: Peter J. Kivits, Waalre (NL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,448

(22) Filed: Apr. 11, 2012

Related U.S. Application Data

(63) Continuation of application No. 12/360,587, filed on Jan. 27, 2009, now Pat. No. 8,159,919.

(60) Provisional application No. 61/024,330, filed on Jan. 29, 2008.

(51) Int. Cl.
*G11B 7/00* (2006.01)

(52) U.S. Cl.
USPC .................. 369/53.32; 369/47.53; 369/59.11; 369/53.21

(58) Field of Classification Search
USPC ...................................................... 369/59.11
See application file for complete search history.

(56) References Cited

U.S. PATENT DOCUMENTS

| | | | | |
|---|---|---|---|---|
| 5,642,343 A * | 6/1997 | Toda et al. | ................. | 369/47.53 |
| 6,243,339 B1 * | 6/2001 | Spruit et al. | ............... | 369/53.13 |
| 6,532,201 B1 * | 3/2003 | Hogan | ....................... | 369/53.21 |
| 7,933,183 B2 * | 4/2011 | Shin | ........................... | 369/59.11 |
| 8,159,919 B1 * | 4/2012 | Kivits | ........................ | 369/59.11 |
| 2005/0030860 A1 * | 2/2005 | Gage et al. | ................. | 369/47.53 |
| 2005/0157620 A1 * | 7/2005 | Narumi et al. | ............. | 369/47.53 |
| 2006/0203674 A1 * | 9/2006 | Schreurs et al. | ........... | 369/59.11 |
| 2007/0047408 A1 * | 3/2007 | Yu et al. | ..................... | 369/47.53 |
| 2009/0245051 A1 * | 10/2009 | Yu et al. | ..................... | 369/47.53 |

* cited by examiner

*Primary Examiner* — Van Chow

(57) ABSTRACT

Aspects of the disclosure can provide a method to optimize optical recording. The method can include recording a predefined pattern on an optical medium according to a first write strategy, measuring edge timings corresponding to the predefined pattern recorded on the optical medium, determining a second write strategy including at least timing modifications to the first write strategy, and recording data on the optical medium according to the second write strategy. The timing modifications can be determined based on the measured edge timings, edge timing targets for desired edge timings and edge timing sensitivities to the timing modifications.

18 Claims, 8 Drawing Sheets

| PRECEDING SPACE | MARK | | | |
|---|---|---|---|---|
| | 3 | 4 | 5 | 6 |
| 3 | 120 | 60 | 60 | 210 |
| 4 | 60 | 30 | 30 | 180 |
| 5 | 60 | 30 | 30 | 180 |
| 6 | 60 | 30 | 30 | 210 |
| 7 | 60 | 30 | 30 | 150 |
| 8 | 60 | 30 | | 120 |
| 9 | 60 | | | 120 |

FIG. 4A

| FOLLOWING SPACE | MARK | | | |
|---|---|---|---|---|
| | 3 | 4 | 5 | 6 |
| 3 | 60 | 30 | 30 | 330 |
| 4 | 60 | 30 | 30 | 180 |
| 5 | 60 | 30 | 30 | 180 |
| 6 | 60 | 30 | 30 | 210 |
| 7 | 60 | 30 | 60 | 120 |
| 8 | 60 | 60 | | 90 |
| 9 | 120 | | | 60 |

FIG. 4B

SENSITIVITY MATRIX S

|  |  | TRANSITIONS | | | |
|---|---|---|---|---|---|
|  |  | S3M3 | S3M4 | S3M5 | S3M6 |
| EDGE CORRESPONDING TO TRANSITIONS | S3M3 | 3 | 0 | 2.2 | 1 |
|  | S3M4 | 0 | 4 | 0 | 1 |
|  | S3M5 | 0 | 0 | 5 | 1 |
|  | S3M6 | 0 | 0 | 0 | 1 |

FIG. 5A — 510

EDGE TIMING MATRIX P

$$\begin{bmatrix} -5 \\ 3 \\ 2 \\ 1 \end{bmatrix}$$

FIG. 5B

EDGE TIMING TARGET MATRIX T

$$\begin{bmatrix} 0 \\ 0 \\ 0 \\ 0 \end{bmatrix}$$

FIG. 5C

TRANSITION ADJUSTMENT = $S^{-1}[T-P]$

$$\begin{bmatrix} +2.1 \\ -0.5 \\ -0.2 \\ -1.0 \end{bmatrix}$$

FIG. 5D

LARGE SENSITIVITY MATRIX
FIG. 6

METHOD AND APPARATUS FOR OPTIMIZING OPTICAL RECORDING

INCORPORATION BY REFERENCE

This application is a continuation of U.S. patent application Ser. No. 12/360,587, filed on Jan. 27, 2009, which claims the benefit of U.S. Provisional Application No. 61/024,330, "Optimizing Write Performance by Control of Phase Edges" filed on Jan. 29, 2008, the disclosures of which are incorporated herein by reference in their entireties.

BACKGROUND

An optical recording system can use laser pulses to record data, for example in the form of marks and spaces, on an optical storage medium. The recording quality, which may determine reading compatibility by other optical reading/recording systems, can be affected by properties of both the optical recording system and the optical storage medium. In order to improve the recording quality, an optical recording system may perform a calibration procedure, such as an optimum power calibration (OPC) procedure, to obtain appropriate parameter values of laser pulses corresponding to a specific optical storage medium, before an actual recording of user data. Then, the optical recording system can use the laser pulses with the appropriate parameter values to perform the user data recording on the specific optical storage medium.

SUMMARY

Aspects of the disclosure can provide a method to optimize optical recording. The method can include recording a pre-defined pattern on an optical medium according to a first write strategy, measuring edge timings corresponding to the pre-defined pattern recorded on the optical medium, determining a second write strategy including at least timing modifications to the first write strategy, and recording data on the optical medium according to the second write strategy. The timing modifications can be determined based on the measured edge timings, edge timing targets for desired edge timings and edge timing sensitivities to the timing modifications.

Additionally, the method can include determining a power modification based on an average of the measured edge timings. Then, the second write strategy can include both the power modification and the timing modifications to the first write strategy.

To determine the timing modifications, the method can include obtaining an inverse of an edge timing sensitivity matrix. Each element in the edge timing sensitivity matrix can indicate a timing change of an edge in a first matrix dimension with regard to a unit change of a transition in a second matrix dimension.

Further, to obtain the inverse of the edge timing sensitivity, the method can include reading the edge timing sensitivity matrix from firmware, and calculating the inverse edge timing sensitivity matrix. Alternatively, the firmware may include the inverse edge timing sensitivity, thus the method can include reading the inverse edge timing sensitivity matrix from the firmware.

Further, the method can include determining the first write strategy based on address in pre-groove (ADIP) information. In addition, the method can include obtaining the edge timing targets and the edge timing sensitivities from firmware.

According to an aspect of the disclosure, the pre-defined pattern can include an optical power and timing calibration pattern. The pre-defined pattern can be recorded in an optical power calibration section of the optical medium.

Aspects of the disclosure can provide an optical drive. The optical drive can include a recording unit configured to drive a laser unit to record patterns on an optical medium according to a write strategy, a reading unit configured to generate reading signals corresponding to recorded patterns on the optical medium, and a controller. The controller can be configured to provide the recording unit with a first write strategy for the recording unit to one-time record a pre-defined pattern on the optical medium. Further, the controller can measure edge timings corresponding to the recorded pre-defined pattern from signals generated by the reading unit. Then, the controller can determine a second write strategy including at least timing modifications to the first write strategy, and provide the second write strategy to the recording unit. According to the disclosure, the timing modifications can be determined based on the measured edge timings, edge timing targets and edge timing sensitivities to the timing modifications.

BRIEF DESCRIPTION OF THE DRAWINGS

Various exemplary embodiments of this disclosure will be described in detail with reference to the following figures, wherein like numerals reference like elements, and wherein:

FIGS. 4A-4E show exemplary tables and plots for obtaining an edge timing distribution;

FIGS. 5A-5E show exemplary matrices, equations and plots for a calibration process; and FIG. 6 shows an exemplary sensitivity matrix according to an embodiment of the disclosure.

DETAILED DESCRIPTION OF EMBODIMENTS

Figure 1:
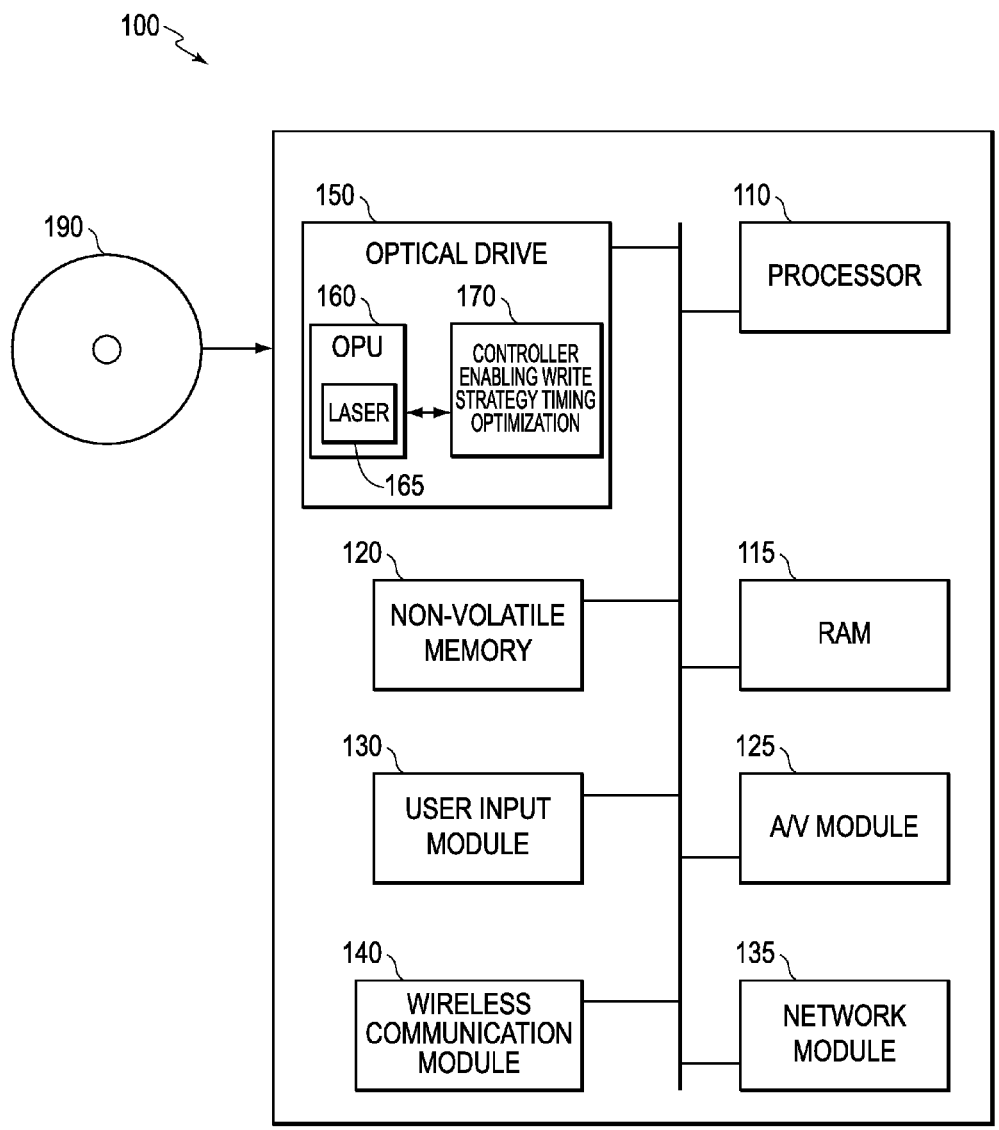
FIG. 1 shows a block diagram of an exemplary medium system.

FIG. 1 shows a block diagram of an exemplary medium system according to the disclosure. The medium system 100 can include an optical drive 150 and other components, such as a processor 110, a random access memory (RAM) module 115, a non-volatile memory module 120, an audio/video module 125, a user input module 130, a network module 135, and a wireless communication module 140. These components can be coupled together as shown in FIG. 1.

The optical drive 150 can further include an optical pickup unit (OPU) 160, and a controller 170. The OPU 160 can record data to a memory medium, such as an optical disc 190, and can read the recorded data from the optical disc 190. The optical disc 190 may store data on a recording track in the form of marks and spaces.

The OPU 160 can further include a laser unit 165. The laser unit 165 can be controlled to record data on the optical disc 190 in a recording process and can be used to read the recorded data from the optical disc 190 in a reading process. During the recording process, the laser unit 165 can be controlled to emit high power laser pulses according to a write strategy and data to be recorded. The write strategy may include write strategy parameters for the laser pulses, such as laser pulse power, pulse length, pulse phase, pulse interval, switch speed, and the like. The data to be recorded may be encoded according to one or more coding schemes. According to the write strategy and the data to be recorded, the laser pulses can be directed to the recording track of the optical disc 190, and may selectively change an optical property, such as reflectivity, of the recording track, such that the recording track can be in the form of marks and spaces.

During the reading process, the laser unit 165 can be controlled to emit a low energy laser beam. The laser beam can be directed onto the recording track of the optical disc 190. The laser beam can be reflected by the recording track. The reflected laser beam may have a light intensity corresponding to the optical property of the recoding track. Further, the light intensity can be detected by a detector (not shown) of the OPU 160. The detector may generate an electrical signal, such as a voltage signal, corresponding to the light intensity. The electrical signal may have a property, such as an amplitude of the voltage signal, corresponding to the optical property at the recording track, which can be used to differentiate the marks or the spaces on the recording track.

It is noted that various coding schemes may use transitions between marks and spaces to encode data instead of directly using marks and spaces to represent binary states in order to improve recording performance. For example, a non-return-to-zero inverted (NRZI) coding scheme may use transitions, including transitions from marks to spaces, or transitions from spaces to marks, to encode "1", and use no-transitions to encode "0". The transition based coding schemes can reduce DC noise influence, and thus improve recording performance.

The transitions between marks and spaces may result in edges, such as voltage increase edges and voltage decrease edges, in the electrical signal generated by the detector of the OPU 160. The edges can be compared to a system clock to obtain edge timings. The edge timings can be used to decode the encoded data. In the NRZI example, timings of two adjacent edges may determine a number of zeros between two ones. Thus, timings for the laser pulses to record the transitions between marks and spaces can have an effect on the recording performance.

According to the disclosure, the controller 170 can enable a one-time write strategy timing optimization process to determine an optimum write strategy for the optical drive 150 to record data on the specific optical disc 190. The one-time write strategy timing optimization process can record a pre-defined pattern for one time on the optical disc 190 before an official recording, and determine the optimum write strategy based on the one-time recording. More specifically, the controller 170 can may determine an initial write strategy, and control the laser unit 165 to record the pre-defined pattern for one time on the optical disc 190 according to the initial write strategy. In an embodiment, the initial write strategy may be determined based on address in pre-groove (ADIP) information on the optical disc 190. The pre-defined pattern may include transitions under various contexts, such as various lengths of marks and spaces. Further, the controller 170 can control the OPU 160 to read the recorded pattern from the optical disc 190. The controller 170 may receive electrical signals with edges corresponding to the transitions between spaces and marks. The controller 170 may measure edge timings and edge timing distributions for the various contexts with regard to a system clock.

Additionally, the controller 170 may include edge timing targets, which can be in the form of a target matrix, and edge timing sensitivities, which can be in the form of a sensitivity matrix. The edge timing targets may correspond to edge timings that are known of high recording performance. The edge timing sensitivities may correspond to edge timing changes with regard to changes in the write strategy, such as laser pulse timing changes. The edge timing targets and the edge timing sensitivities may be pre-determined, and can be stored in firmware that can be available to the controller 170, such as in the non-volatile memory 120. Then, based on the edge timing distributions, the edge timing targets and the edge timing sensitivities, the controller 170 may determine the changes of the recording laser pulses that can substantially achieve the edge timing targets. The above operations may only need to be executed for one time to obtain the optimum write strategy, such that time for calibration can be reduced.

In an embodiment, the edge timing sensitivities may be in the form of edge timing changes with regard to transition location shifts. The controller 170 may first determine the transition location shifts to achieve the edge timing targets, and then determine laser pulse parameters of a specific type of write strategy to achieve the transition location shifts. In another embodiment, the edge timing sensitivity may be in the form of edge timing changes with regard to laser pulse timings of a specific type of write strategy. Then, the controller 170 may directly determine optimum laser pulse parameters of the specific type of write strategy.

It is noted that the optical drive 150 may include various other components that can assist the recording operation and the reading operation. For example, the OPU 160 may include a set of lens for guiding the laser beam, and photodiodes for detecting the reflected light from the recording track.

It is also noted that the optical drive 150 may operate with the other components of the medium system 100 for various applications. For example, the processor 110 can execute instructions, and perform data operations. The processor 110 may provide data to the optical drive 150 for storing on the optical disc 190.

The non-volatile memory module 120 can hold information even when power is off. Therefore, the non-volatile memory 120 can be used to store system and application codes, such as firmware. The RAM module 115 is readable and writable. Generally, the RAM module 115 can have a fast access speed. It can be preferred that data and codes are stored in the RAM module 115 during operation, such that the processor 110 can access the RAM module 115 for the codes and the data instead of the non-volatile memory 120.

The user input module 130 may enable the user to control operations of the medium system 100. The user input module 130 may include various user input devices, such as keyboard, mouse, touch screen, and the like. In addition, the user input module 130 may include interfaces that can enable external user input devices.

The audio/video module 125 may include various audio and video devices, such as microphone, display screen, and the like. In addition, the audio/video module 125 may include interfaces that can enable external audio and video devices. The audio/video module 125 can be utilized to play audio data/video data that can be stored in the optical disc 190.

The network module 135 and the wireless communication module 140 may enable the medium system 100 to receive data from other system. The received data can be recorded on the optical disc 190.

Figure 2:
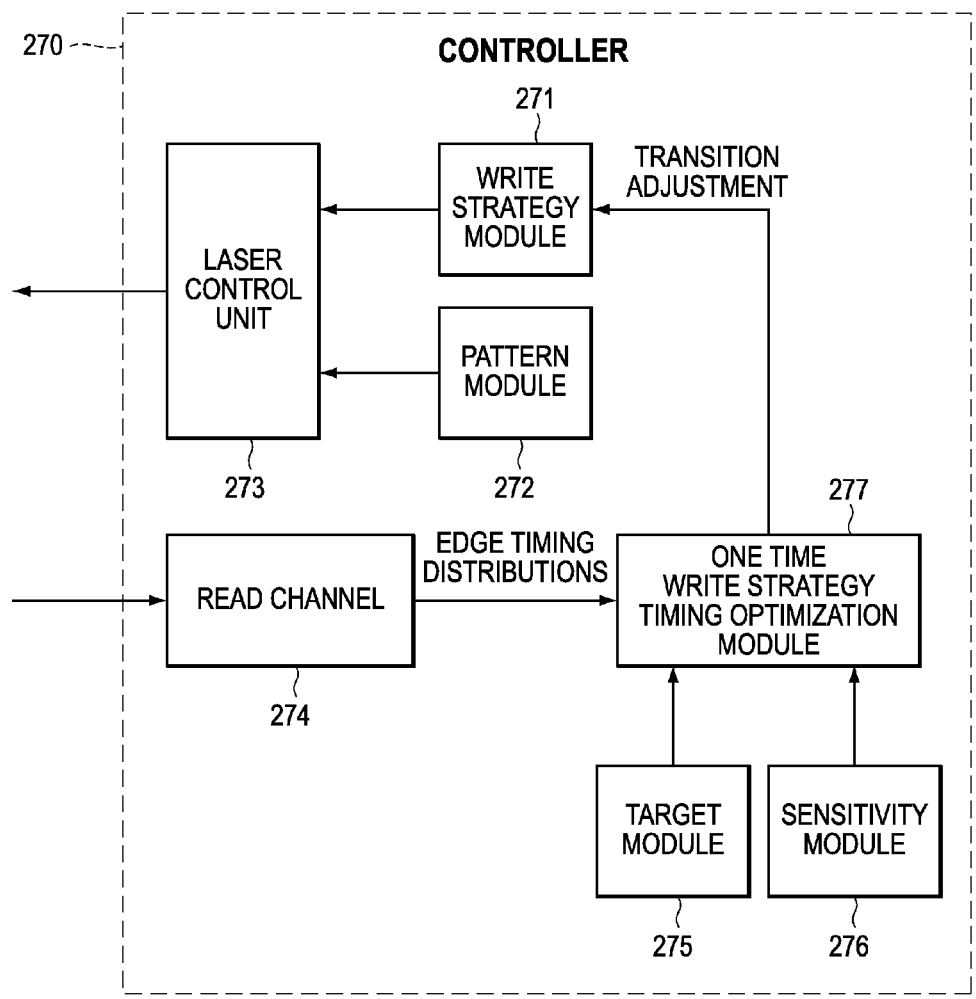
FIG. 2 shows a block diagram of an exemplary controller for an optical drive.

FIG. 2 shows an exemplary controller module 270 according to an embodiment of disclosure. The controller 270 may include a write strategy module 271, a pattern module 272, a laser control unit 273, a read channel module 274, a target module 275, a sensitivity module 276, and a one-time write strategy timing optimization module 277. These elements can be coupled together as shown in FIG. 2.

The write strategy module 271 may include various types of write strategies for laser pulses, such as block strategy, castle strategy, and the like. Each type of write strategy may include adjustable write strategy parameters. The write strategy module 271 may provide a write strategy, such as a type of write strategy with write strategy parameter values, to the laser control unit 273 to record data. For example, the write strategy module 271 may provide an initial write strategy, such as a type of write strategy with default parameter values, to the laser control unit 273 at a beginning of a write strategy timing optimization process. In an embodiment, the initial write strategy may be determined based on ADIP information of a specific optical disc. Additionally, the write strategy module 271 may provide an optimum write strategy based on information from the one-time write strategy timing optimization module 277.

The write strategy module 271 may include write strategy parameter registers for holding write strategy parameters. The write strategy module 271 may adjust the write strategy parameters based on the information from the one-time write strategy timing optimization module 277. In an embodiment, the write strategy module 270 may include a table for a write strategy. The table may include entries corresponding to various recording contexts, such as transitions between various lengths of marks and spaces. Each entry may define laser pulse parameters for recording one or more transition contexts.

The pattern module 272 may provide recording patterns to the laser control unit 273. For example, the pattern module 272 may provide a pre-defined pattern to the laser control unit 273 for the write strategy timing optimization process. In an embodiment, the pre-defined pattern may include a number of occurrences for each transition context. Additionally, the pattern module 272 may convert data into a recording pattern, and provide the recording pattern to the laser control unit 273 for recording.

The laser control unit 273 can control a laser source based on the write strategy and the recording pattern. Thus, the recording pattern can be recorded on the specific optical disc according to the write strategy.

The read channel module 274 can receive signals corresponding to patterns on the optical disc from an OPU. For example, the read channel module 274 can receive a voltage signal corresponding to the recorded pre-defined pattern on the optical disc in the write strategy timing optimization process. Further, the read channel module 274 can detect edges, such as voltage increase edges and voltage decrease edges in the voltage signal. The edges can correspond to transitions in the recorded pattern on the optical disc. Then, the read channel module 274 can measure edge timings with regard to a clock signal, such as a system clock signal. Additionally, the read channel module 274 may analyze the edge timing distributions, and provide the edge timing distributions to the one-time write strategy timing optimization module 277. In an embodiment, the read channel module 274 may calculate means and variances for the edge timing distributions, and provide the means and variances to the one-time write strategy timing optimization module 277. In another embodiment, the read channel module 274 may provide the edge timings to the one-time write strategy timing optimization module 277, and the one-time write strategy timing optimization module 277 may include a calculation unit to calculate the means and variances.

The one-time write strategy timing optimization module 277 can receive edge timing distributions from the read channel module 274. In addition, the one-time write strategy timing optimization module 277 can receive edge timing targets from the target module 275, and edge timing sensitivities from the sensitivity module 276. The edge timing targets may correspond to desired edge timings. The edge timing sensitivities may represent changes of edge timings with regard to changes in the transition locations. In an embodiment, the edge timing targets can be in the form of a target matrix, and the edge timing sensitivities can be in the form of one or more sensitivity matrices. Further, the one-time write strategy timing optimization module 277 can determine transition adjustments based on the edge timing distributions, the edge timing target and the edge timing sensitivities. In an embodiment, the one-time write strategy timing optimization module 277 may use matrix calculation to calculate the transition adjustments. The transition adjustments can be provided to the write strategy module 271 to adjust the write strategy accordingly.

According to an embodiment of the disclosure, the write strategy module 271 may adjust the write strategy registers that define the laser pulse parameters for recording the transitions, such that the adjustments of the laser pulses can result in the desired adjustments in the recorded transitions between marks and spaces.

It is noted that the elements of the controller 270 may be implemented in the form of software that can be executed by a processor, such as the processor 110. Alternatively, the elements of the controller 270 may be implemented in the form of hardware, such as application specific integrated circuits (ASICs), and the like. Further, the elements of the controller 270 may be implemented in the form of a combination of software and hardware.

Figure 3:
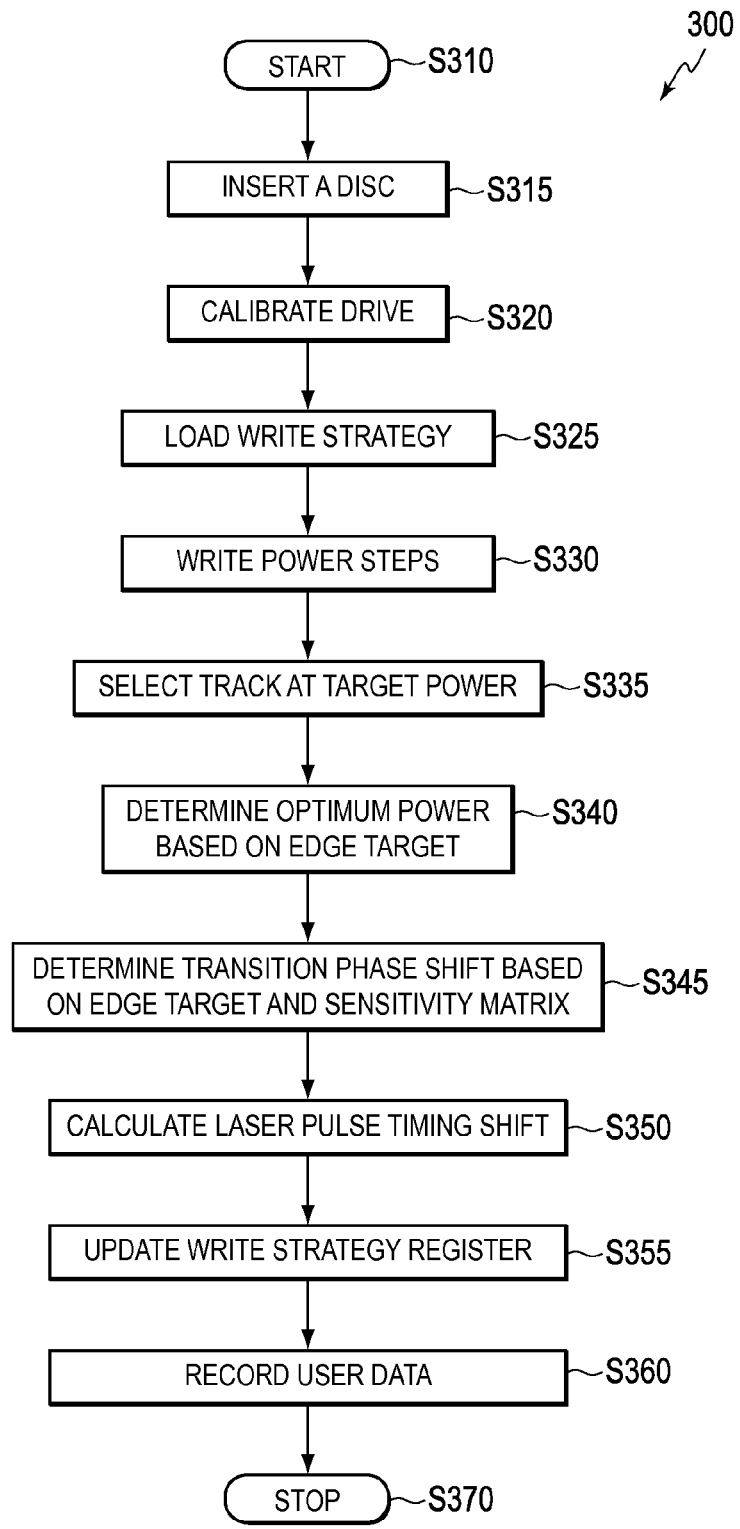
FIG. 3 shows a flowchart outlining an exemplary calibration process.

FIG. 3 shows a flowchart outlining an exemplary one-time write strategy timing optimization process. The process starts at step S310 and proceeds to step S315.

In step S315, an optical disc can be inserted in an optical drive. Then, the process proceeds to step S320.

In step S320, the optical drive can be calibrated with regard to the optical disc. For example, the focus parameters of the optical drive may be calibrated with regard to the optical disc. Then, the process proceeds to step S325.

In step S325, the optical drive may load a write strategy, for example into registers. The optical drive may include write strategies for various types of optical discs. The optical drive may obtain disc information, such as manufacture, model, and the like, and load the write strategy based on the disc information. Then, the process proceeds to step S330.

In step S330, the optical drive may record a pre-determined pattern according to multiple powers. The optical drive can record multiple tracks of the predetermine pattern corresponding to the multiple powers, respectively. The pre-defined pattern may include a number of occurrences for each possible transition context. According to the disclosure, an optimum write strategy can be determined based on the recorded pre-determined patterns. It is noted that the optimum write strategy can be determined exclusively on the recorded pre-determined patterns in the step S330, even though the optical drive may perform additional test recordings. In an embodiment, the optical drive may only perform test recording once, which can record the pre-determined pattern, and determine the optimum write strategy based on the one-time recording, thus time for write strategy calibration can be reduced. Then, the process proceeds to step S335.

In step S335, the optical drive may select a track that is close to a target power from the multiple recorded tracks. More specifically, the optical drive may read the multiple tracks, and select a track, which corresponds to a power of the multiple powers, based on a quality measure, such as modulation depth, and the like. Then, the process proceeds to step S340.

In step S340, the optical drive can determine an optimum power based on an edge timing target. The optical drive may receive an electrical signal corresponding to the selected track. The electrical signal may include voltage rising and falling edges corresponding to the transitions between spaces and marks in the selected track. The optical drive may measure edge timings with regard to, for example a system clock, and may analyze the edge timing distributions. Further, the optical drive may determine a laser pulse power adjustment according to the measured edge timings. In an embodiment, the laser pulse power adjustment can be determined based on an edge timing target. For example, the laser power adjustment may be used to achieve the average of the measured edge timing to be zero. Then, the process proceeds to step S345.

In step S345, the optical drive may determine transition adjustments based on the edge timing distributions, edge timing targets and edge timing sensitivities. In an embodiment, the optical drive may store pre-determined edge timing targets, and pre-calibrated edge timing sensitivities in the matrix form in a memory unit. Further, the optical drive may use matrix calculation to determine the transition adjustments. In another embodiment, the optical drive may store an inverse matrix of the pre-calibrated edge timing sensitivities, and may determine the transition adjustment partially based on the inverse matrix. Then, the process proceeds to step S350.

In step S350, the optical drive may calculate laser pulse timing shifts corresponding to the transition adjustments. Then, the process proceeds to step S355.

In step S355, the optical drive can update the write strategy registers according to the laser pulse timing shifts. Then, the process proceeds to step S360.

In step S360, the optical drive may record user data according to the updated write strategy registers. It is noted that the parameters stored in the write strategy registers are based exclusively on one recording step S330, thus the optical drive may be configured not having additional test recording steps other than the step S330, therefore time to obtain the optimum write strategy can be reduced. Then, the process proceeds to step S370 and terminates.

Figure 4C:
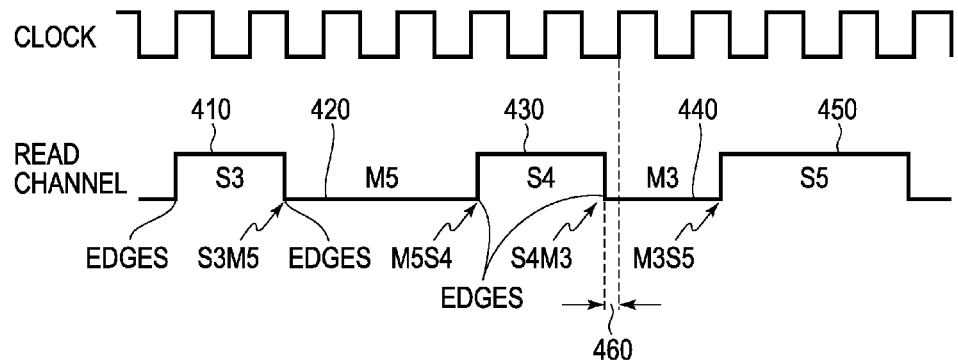

FIGS. 4A-4E show exemplary tables and plots for obtaining edge timing distribution according to an embodiment of the disclosure. FIG. 4A shows a summary table for transitions from spaces to marks according to an exemplary pre-defined pattern. The summary table may include field 401 in column direction for lengths of preceding space, and field 402 in row direction for lengths of mark. Generally, the lengths of the spaces and marks may be represented in terms of clock cycles. Each element in the table can indicate a number of occurrences of a specific transition context in the pre-defined pattern. The transition context may have a preceding space of a length indicated by field 401, and a mark of a length indicated by field 402. For example, element 403 can indicate 60 occurrences of a transition from a space having a length corresponding to 4 clock cycles (S4) to a mark having a length corresponding to 3 clock cycles (M3).

FIG. 4B shows a summary table of transitions from marks to spaces according to an exemplary pre-defined pattern. The summary table may include field 405 in column direction for lengths of following space, and field 406 in row direction for length of mark. Each element in the table can indicate a number of occurrences of a specific transition context in the pre-defined pattern. The specific transition context may have a mark of a length indicated by field 406, and a following space of a length indicated by field 405. For example, element 407 can indicate 60 occurrences of a transition from a mark having a length corresponding to 3 clock cycles (M3) to a space having a length corresponding to 5 clock cycles (S5).

FIG. 4C shows a portion of an exemplary read channel signal with regard to a clock signal according to an embodiment of the disclosure. The read channel signal may have high voltage portions corresponding to spaces on a recording track, and low voltage portions corresponding to marks on the recording track. For example, high voltage portions 410, 430, and 450 may correspond to spaces S3, S4 and S5 respectively, and low voltage portions 420 and 440 may correspond to marks M5 and M3 respectively. The read channel signal may have rising and falling edges corresponding to transitions between spaces and marks. In the example, a rising edge may correspond to a transition from mark to space, which may be represented by MxSy, such as M5S4 and M3S5, and a falling edge may correspond to a transition from space to mark, which may be represented as SyMx, such as S3M5 and S4M3.

Figure 4D:
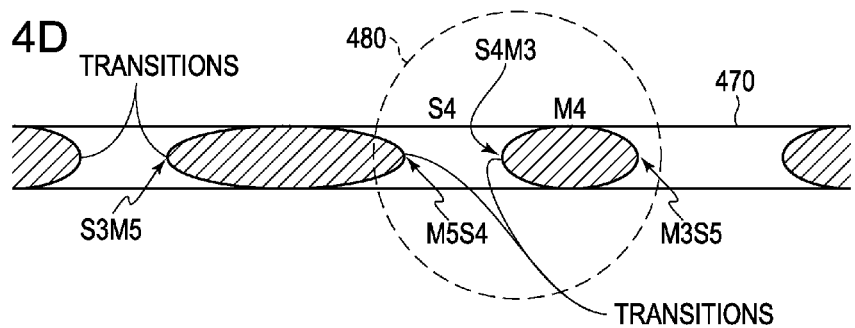

FIG. 4D shows a portion of an exemplary recording track 470 and an exemplary reading laser spot 480. According to the disclosure, the reading laser spot 480 can be reflected by the recording track 470. The reflected laser can have an intensity related to patterns on the recording track 470. In the example of FIG. 4D, the reading laser spot 480 are substantially centered at S4M3. Thus, the intensity of the reflected laser may be related to the S4M3. However, the size of the reading laser spot 480 may be comparable with the lengths of marks and spaces on the recording track 470. Thus, other transitions, such as M5S4 and M3S5 in FIG. 4D, can also affect the intensity of the reflected laser from S4M3. Accordingly, if the laser pulse timings for M5S4 or M3S5 are changed, the detected edge timing of the S4M3 can change.

Figure 4E:
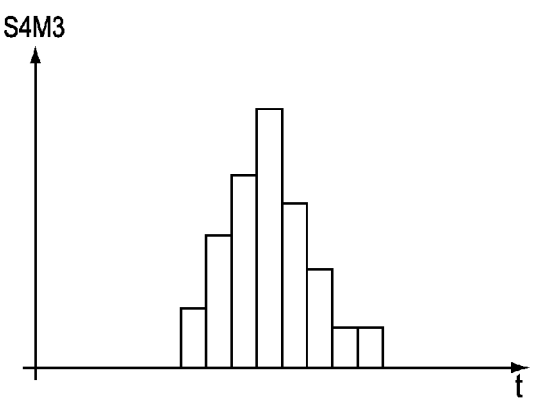

The edge timings may be measured with regard to the clock signal. For example, the edge timing corresponding to transition S4M3 may be measured by timing difference indicated as 460 in FIG. 4C. Further, the edge timings corresponding to transitions may be statistically analyzed. FIG. 4E shows an exemplary edge timing distribution plot for the transition S4M3. Additionally, statistical parameters, such as means and variances, may be calculated for the transitions.

Figure 5E:
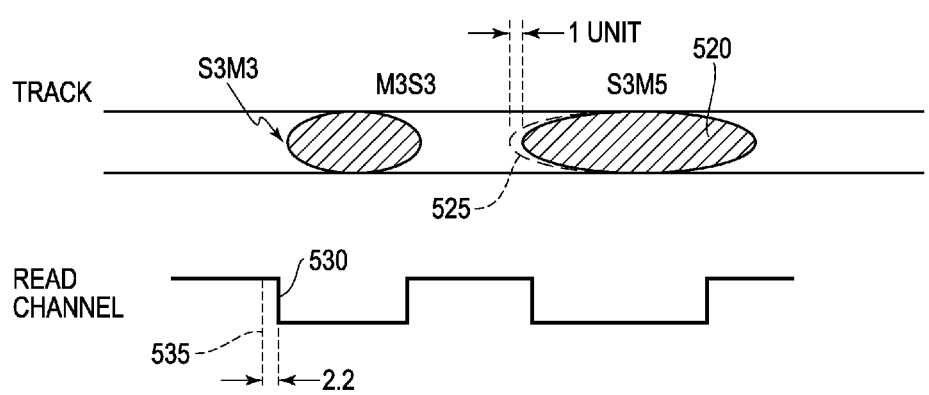

FIGS. 5A-5E show exemplary matrices, plots and matrix calculations to determine transition adjustments according to an embodiment of the disclosure. FIG. 5A shows an exemplary sensitivity matrix S. The sensitivity matrix S may include a first dimension (in horizontal direction) of transitions in the context of spaces and marks, and a second dimension (in vertical direction) for edges of the read channel signal corresponding to the transitions. In the example of FIG. 5A, the first dimension may include transitions S3M3, S3M4, S3M5 and S3M6; and the second dimension may include edges of the read channel signal corresponding to the transitions S3M3, S3M4, S3M5 and S3M6.

An element in the sensitivity matrix may correspond to a transition in the first dimension and an edge in the second dimension. The transition in the first dimension can be a cause that may result in a consequence of changes of the edge in the second dimension. The element may indicate a value of the consequence with regard to a unit change in the cause. The unit change may device or design dependent. For example, for one device, a unit change in the transition may correspond to $$\frac{3}{128}$$

of a clock cycle, and for another device, a unit change in the transition may correspond to of a cloth cycle.

In the example of FIG. 5A, element 510 can correspond to a transition S3M5 and an edge S3M3. The value 2.2 of element 510 can indicate 2.2 changes of the edge S3M3, as a result of a unit change of the transition S3M5. It is noted that the changes of the edges may be measured in time domain, and may be measured in a domain other than the time domain.

FIG. 5E shows exemplary plots of a track portion and a read channel signal corresponding to the track portion for the above example. The track portion can include transitions S3M3, M3S3, and S3M5. When the transition S3M5 changes one unit, as shown by 520 and 525, the read channel signal corresponding to the transition S3M3 may be affected, as shown by 530 and 535. According to 510, the read channel signal corresponding to the transition S3M3 can shift about 2.2. It is noted that the shift 2.2 is a statistical value, which may be an average value of a number of occurrences.

FIG. 5B shows an exemplary edge timing matrix P for measured edge timing distributions. The edge timing matrix P may include a column of means for the measured edge timing distributions. FIG. 5C shows an exemplary edge timing target matrix T for desired edge timings.

FIG. 5D shows an exemplary matrix operation that can be used to determine transition adjustments based on the sensitivity matrix S in FIG. 5A, the edge timing matrix P in FIG. 5B and the edge timing target matrix T in FIG. 5C.

In an embodiment, an optical drive may store an edge timing target matrix T and a sensitivity matrix S in a memory unit, such as in the form of firmware. Then, the optical drive may perform the one time recording step S320, and measure the edge timing distribution to obtain the edge timing matrix P. Further, the optical drive can perform the matrix operation in FIG. 5D to determine the transition adjustments.

It is noted that the matrix operation includes calculating an inverse sensitivity matrix $S^{-1}$, which can generally take a large portion of computing time and computing power, due to the reason that the sensitivity matrix may be large. In an embodiment, an optical drive may store an edge timing target matrix T and an inverse sensitivity matrix $S^{-1}$ that is pre-calculated in a memory unit. Thus, when the optical drive performs the matrix operation in FIG. 5D, the inverse sensitivity matrix $S^{-1}$ can be read from the memory unit, to avoid repetitive inverse matrix calculation at real-time, thus the time and the computing power to calculate the inverse sensitivity matrix $S^{-1}$ can be saved.

It is noted that while the matrix based example in FIGS. 5A-5D includes four transitions for the purpose of ease and clarity, the matrix based method can be suitably extended to determine transition adjustments for any number of transitions. It is also noted that the matrix operation may be performed by a processor executing an algorithm.

Figure 6:
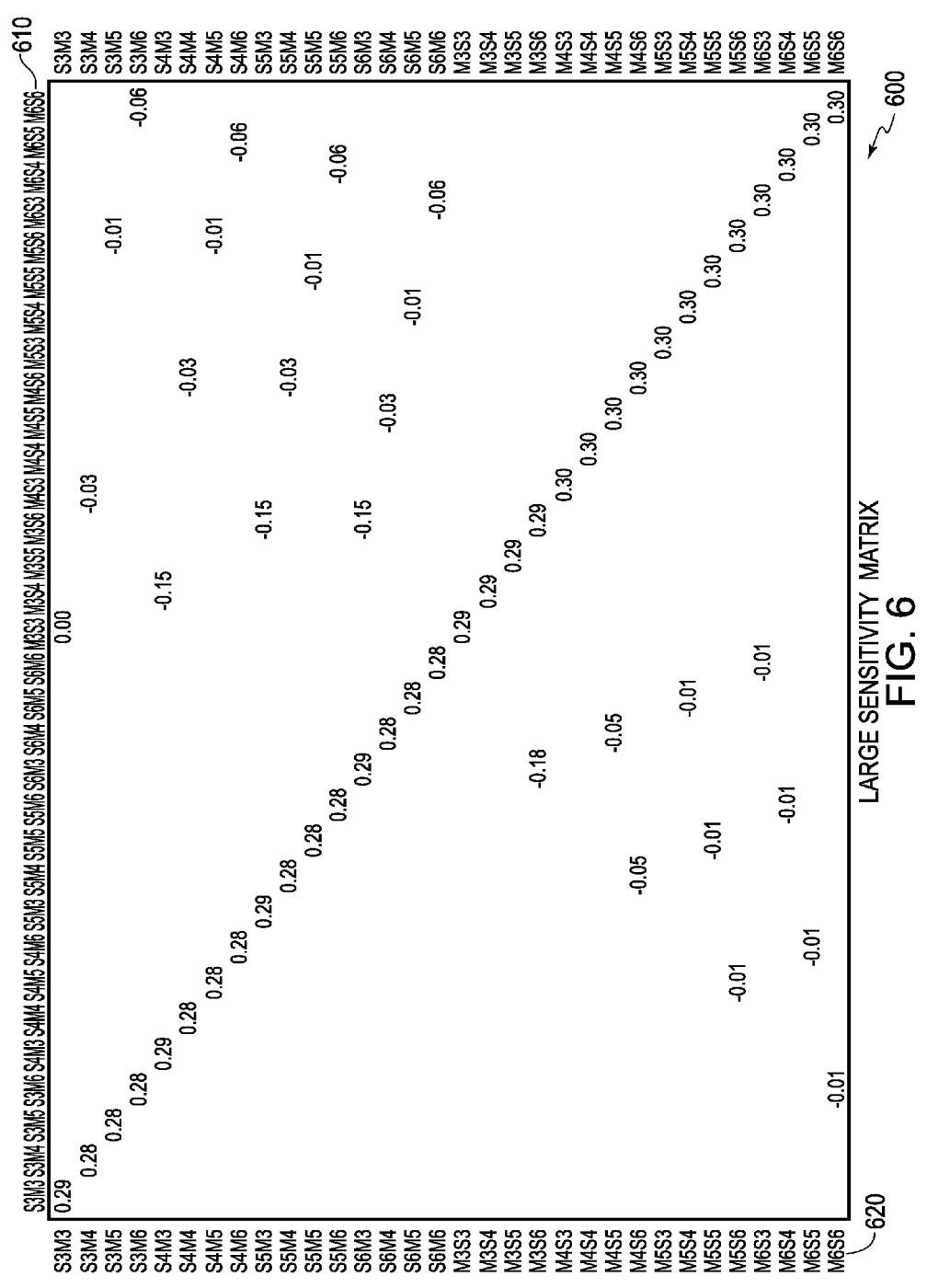

FIG. 6 shows another exemplary edge timing sensitivity matrix. The edge timing sensitive matrix 600 can include a first dimension 610 and a second dimension 620. The first dimension 610 may include independently adjustable transitions for an eight-to-fourteen (EFM) code scheme. According to an embodiment of the disclosure, the EFM code scheme may include 50 transition contexts. However, an optical drive may be configured to be able to adjust 32 of the transitions independently. For example, the optical drive may include 32 entries for a write strategy, and each entry may store write strategy parameters for recording one or more transitions. The second dimension 620 may include edges corresponding to the transitions in the first dimension. Each element in the edge timing sensitivity matrix 600 may correspond to a transition in the first dimension and an edge in the second dimension. The value of the element may indicate timing changes of the edge as a result of laser pulse changes for a unit change of the transition.

In an embodiment, the edge timing sensitivity matrix may be pre-calibrated, and stored, for example in firmware. It is noted that the edge timing sensitivity matrix may be updated when a more accurate version is available. In another embodiment, an inverse of the edge timing sensitivity matrix 600 may be pre-calculated and stored to save real-time calculation time.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. An optical drive, comprising:
  a controller configured to provide a first write strategy for a recording unit to record a pre-defined pattern on an optical medium, measure edge timings corresponding to the recorded pre-defined pattern, determine a power modification based on an average of the measured edge timings, provide a second write strategy for the recording unit to record user data, the second write strategy including at least the power modification and timing modifications to the first write strategy, and calculate an inverse edge timing sensitivity matrix that is an inverse of an edge timing sensitivity matrix.

2. The optical drive according to claim 1, further comprising:
  a reading unit configured to generate reading signals corresponding to recorded patterns on the optical medium.

3. The optical drive according to claim 1, wherein the controller is further configured to provide the timing modifications based on the measured edge timings, edge timing targets and edge timing sensitivities to the timing modifications.

4. The optical drive according to claim 3, wherein the edge timing sensitivities are defined by degrees of a timing change of an edge caused by a transition from a pair of space and mark of the pre-defined pattern to another pair of space and mark of the pre-defined pattern.

5. The optical drive according to claim 1, wherein each element in the edge timing sensitivity matrix indicates a timing change of an edge in a first matrix dimension with regard to a unit change of a transition in a second matrix dimension.

6. The optical drive according to claim 1, further comprising:
  a memory unit storing the edge timing sensitivity matrix.

7. The optical drive according to claim 1, further comprising:
  a memory unit storing the inverse edge timing sensitivity matrix.

8. The optical drive according to claim 1, wherein the first write strategy is determined based on address in pre-groove (ADIP) information.

9. The optical drive according to claim 1, wherein the pre-defined pattern is recorded in an optical power calibration section of the optical medium.

10. A method to optimize optical recording, comprising:

causing recording of patterns on an optical medium by a recording unit according to a write strategy;

providing a first write strategy by a controller for the recording unit to record a pre-defined pattern on the optical medium;

measuring edge timings corresponding to the recorded pre-defined pattern;

determining a power modification based on an average of the measured edge timings;

providing a second write strategy for the recording unit to record user data, the second write strategy including at least the power modification and timing modifications to the first write strategy; and calculating an inverse edge timing sensitivity matrix that is an inverse of an edge timing sensitivity matrix.

11. The method according to claim 10, further comprising:

generating reading signals by a reading unit, the signals corresponding to recorded patterns on the optical medium.

12. The method according to claim 10, further comprising:

providing the timing modifications based on the measured edge timings, edge timing targets and edge timing sensitivities to the timing modifications.

13. The method according to claim 12, further comprising:

defining the edge timing sensitivities by degrees of a timing change of an edge caused by a transition from a pair of space and mark of the pre-defined pattern to another pair of space and mark of the pre-defined pattern.

14. The method according to claim 10, wherein each element in the edge timing sensitivity matrix indicates a timing change of an edge in a first matrix dimension with regard to a unit change of a transition in a second matrix dimension.

15. The method according to claim 10, further comprising:

storing the edge timing sensitivity matrix in a memory unit.

16. The method according to claim 10, further comprising:

storing the inverse edge timing sensitivity matrix in a memory unit.

17. The method according to claim 10, further comprising:

determining the first write strategy based on address in pre-groove (ADIP) information.

18. The method according to claim 10, further comprising:

recording the pre-defined pattern in an optical power calibration section of the optical medium.

\* \* \* \* \*